United States Patent [19]
Takeda et al.

[11] Patent Number: 5,467,218
[45] Date of Patent: Nov. 14, 1995

[54] OPTICAL FIBER AMPLIFIER

[75] Inventors: Keiko Takeda; Shinya Inagaki; Kenji Tagawa; Kazuya Sasaki, all of Kawasaki, Japan

[73] Assignee: Fujitsu Limited, Kanagawa, Japan

[21] Appl. No.: 281,998

[22] Filed: Jul. 29, 1994

[30] Foreign Application Priority Data

Dec. 17, 1993 [JP] Japan ................................. 5-318358

[51] Int. Cl.$^6$ .................................................. H01S 3/06
[52] U.S. Cl. ............................................. 359/341; 372/6
[58] Field of Search .......................... 359/341; 372/6

[56] References Cited

U.S. PATENT DOCUMENTS

| | | | |
|---|---|---|---|
| 5,058,976 | 10/1991 | DiGiovanni et al. | 359/173 |
| 5,140,598 | 8/1992 | Tagawa et al. | 372/6 |
| 5,155,621 | 10/1992 | Takeda et al. | 359/341 X |
| 5,195,149 | 3/1993 | Pfeiffer et al. | 385/28 |
| 5,218,608 | 6/1993 | Aoki | 372/6 |
| 5,260,816 | 11/1993 | Edagawa et al. | 359/341 |
| 5,291,501 | 3/1994 | Hanna | 372/6 |
| 5,338,607 | 8/1994 | Kawamoto et al. | 428/373 |

FOREIGN PATENT DOCUMENTS

| | | |
|---|---|---|
| 4-86728 | 3/1992 | Japan. |
| 6-69571 | 3/1994 | Japan. |

*Primary Examiner*—Mark Hellner
*Attorney, Agent, or Firm*—Staas & Halsey

[57] ABSTRACT

An optical fiber amplifier employs an optical fiber and an optical coupler. The optical fiber has a core and a clad. The core has an erbium-aluminum-doped center and an erbium-doped annular section. The optical coupler guides signal light and pump light to the optical fiber, which amplifies the signal light using the pump light. The center of the core corresponds to a section where the field diameter of the signal light overlaps that of the pump light. The annular section is outside the field diameter of the pump light. The amplifier provides a required gain without employing optical parts such as filters. The signal light has a wavelength in the 1.5-micrometer band, and the pump light has a wavelength, in the 1.45-micrometer band, corresponding to the absorption band of erbium. The present invention may further employ pump light having a wavelength in the 0.98-micrometer band. The optical fiber may be doped with erbium and aluminum only in an annular section around the center of the core, to prevent a gain drop near a wave length of 0.98 micrometers.

27 Claims, 12 Drawing Sheets

OPTICAL FIBER AMPLIFIER

BACKGROUND OF THE INVENTION

1. Field of the Invention

The present invention relates to an optical fiber amplifier, and particularly, to an optical fiber amplifier for amplifying optical signals using a pump light.

2. Description of the Related Art

Optical amplifiers for directly amplifying optical signals are classified into (a) optical fiber amplifiers employing an optical fiber doped with rare earth elements such as Er (erbium), Nd (neodymium), or Pr (praseodymium), (b) semiconductor laser amplifiers doped with rare earth elements, and (c) optical amplifiers using a nonlinear effect in an optical fiber such as a stimulated Raman scattering effect or a stimulated Brillouin scattering effect.

Among these optical amplifiers, the optical fiber amplifiers (a) have no polarization dependency, cause low noise, and involve low connection loss with respect to a transmission optical fiber. These optical fiber amplifiers are used to extend the relay distance and the number of branches of the optical signals in an optical communication system.

In particular, the optical fiber amplifiers employing the Er-doped optical fiber are capable of amplifying optical signals in the 1.5-micrometer band that is not attenuated in an optical fiber. Accordingly, optical fiber amplifiers employing Er-doped optical fiber are more practical than those employing Nd-doped optical fiber for amplifying optical signals in the 1.06- or 1.3-micrometer bands or Pr-doped optical fiber for amplifying optical signals in the 1.3-micrometer band.

The rare-earth-element-doped fiber in the optical fiber amplifiers amplifies optical signals using pump light, which is applied according to a forward pump method, a backward pump method, or a bidirectional pump method. These methods differ from one another in the propagating direction of the pump light with respect to the optical signal.

The Er in the Er-doped fiber demonstrates absorption and fluorescence characteristics, so that the gain of the amplifier employing the Er-doped fiber is dependent on the wavelength of the optical signal light. The gain reaches peaks at 1.536 and 1.55 micrometers in the wavelengths of the optical signal light. The gain drops at around 1.52 micrometers in the wavelength of the optical signal light. The optical fiber amplifiers for amplifying the optical signal light in the 1.5-micrometer band use pump light of 1.48 or 0.98 micrometers wavelength.

To compensate for the loss of gain in the Er-doped optical fiber amplifiers near the 1.54 micrometer wavelength of the optical signal light, the optical fiber may be doped with Er and Al (aluminum). The Er-Al-doped optical fiber exhibits less fluorescence at a wavelength of 1.53 micrometers. The Er distributed in the core below the threshold of the pump light gives no amplification and causes an absorption loss in the optical signals around a wavelength of 1.536 micrometers. This flattens the gain/frequency curve of the amplifier.

To amplify optical signals having a wavelength of 1.55 micrometers, the Er-doped fiber must receive pump light having a wavelength of 1.48 or 0.98 micrometers. The pump light of 0.98 micrometers achieves a good gain and can be handled by simple optical couplers. The wavelength of this pump light, however, greatly differs from that of the optical signal light, so that the field diameter (a width at $1/e^2$ of a maximum value on a luminous intensity curve) of the optical signal light greatly differs from that of the pump light. Accordingly, even the Er-Al-doped optical fiber is insufficient to flatten the gain/frequency curve of the amplifier.

The optical fiber amplifiers using rare-earth-element-doped fiber are applicable to a wavelength multiplexing system. In this case, filter elements must be disposed in the vicinity of the output ends of the amplifiers, to provide a uniform gain over a range of more than ten nanometers on the signal light gain/frequency curve.

A single wavelength system also needs filter elements to prevent oscillations due to spontaneous emission through many optical amplifiers.

However, using the filter elements and other optical parts increases the cost and decreases the reliability, of the system.

SUMMARY OF THE INVENTION

An object of the present invention is to provide an optical fiber amplifier that provides a required gain without employing optical parts such as filters. Further, another object of the present invention is to provide an optical fiber amplifier that provides a high gain.

In order to accomplish the objects, a first aspect of the present invention provides an optical fiber amplifier employing an optical fiber having an erbium-aluminum doped (Er-Al-doped) core center, where the field diameter of the signal light overlaps that of the pump light, and an erbium-doped (Er-doped) annular section outside the field diameter of the pump light. The wavelength of the signal light is in the 1.5-micrometer band. The wavelength of the pump light is in the absorption band of Er. The optical signal light and pump light are made incident to the optical fiber through an optical coupler.

The Al in the core center reduces fluorescence near the 1.536 micrometer wavelength of thesignal light, to compensate for a drop in gain that will occur if the optical fiber contains only Er. The Er in the core center is excited by the pump light and then transits to a ground state to cause stimulated emission to thereby amplify the signal light.

Since the Er in the periphery is spaced apart from the center in an area of weak in luminous intensity, the Er only absorbs spontaneous emission from the core. Namely, the Er amplifies only the signal light and not the spontaneous emission. This results in improving and flattening the gain/frequency curve of the amplifier.

According to a second aspect of the present invention, the wavelength of the pump light is in the 1.45-micrometer band.

When the power of the pump light is changed, the gain of the signal light is different at wavelengths of 1.535, 1.54, and 1.55 micrometers. The pump light at some power level absorbs the signal light at a wavelength of 1.535 micrometers. This function is employable as a filter for the wavelength (1.535 micrometers) of the signal light. This allows the omission of filter elements from the amplifier.

A third aspect of the present invention provides an optical fiber amplifier employing the same optical fiber as that of the first aspect and two kinds of pump light, one in the 0.98-micrometer band and the other in the 1.45-micrometer band.

The power of the two kinds of pump light is changed to change the gain of the amplifier at wavelengths of 1.535, 1.54, and 1.55 micrometers. Accordingly, the gain of the signal light at the respective wavelengths can be optimized by properly adjusting the power of the two kinds of pump light.

A fourth aspect of the present invention provides an optical fiber amplifier employing an optical fiber having a core and a clad. The core has a center and an annular periphery. Within the field diameter of pump light, the annular periphery is doped with Er and Al. This amplifier employs signal light in the 1.5-micrometer band, and pump light in the 0.98-micrometer band.

The fourth aspect uses an optical fiber doped with Er and Al in the annular periphery that is spaced away from the center of the field diameter of the pump light, to change an absorption cross section and an emission cross section, thereby providing a high gain.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before proceeding to a detailed description of the preferred embodiments of the present invention, prior art optical devices for optical communication will be described below for a clearer understanding of the differences between the present invention and the prior art.

Figure 1:
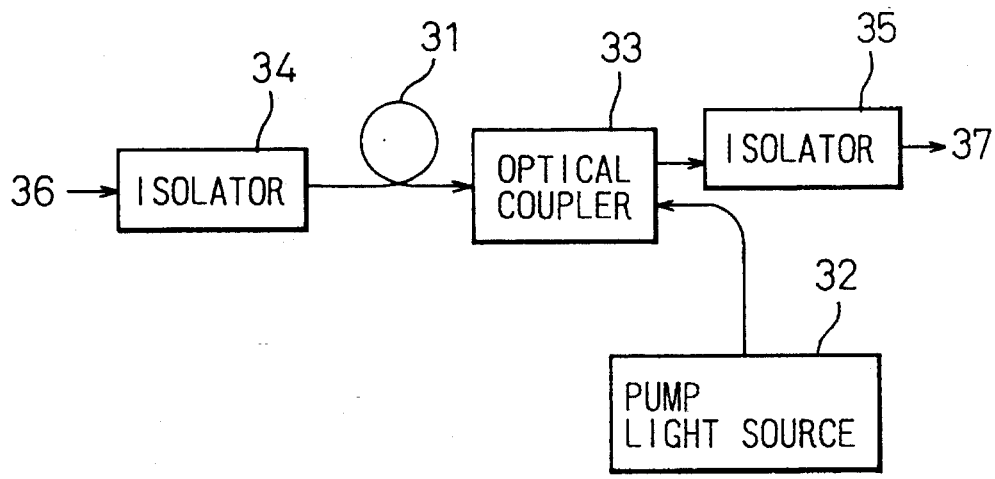
FIG. 1 is a block diagram showing an optical fiber amplifier according to a prior art.

FIG. 1 shows an optical fiber amplifier according to the prior art employing an Er-doped fiber and operating with the backward pump method.

Signal light is guided to the Er-doped fiber 31 through an input end 36 and an isolator 34. Excitation light from a pump light source 32 is guided to the Er-doped fiber 31 through an optical coupler 33. The pump light excites Er atoms, which transit to a low energy state due to the signal light, to cause stimulated emission. The stimulated emission amplifies the signal light, and the amplified signal light is emitted from an output end 37 through the coupler 33 and an isolator 35.

Figure 2:
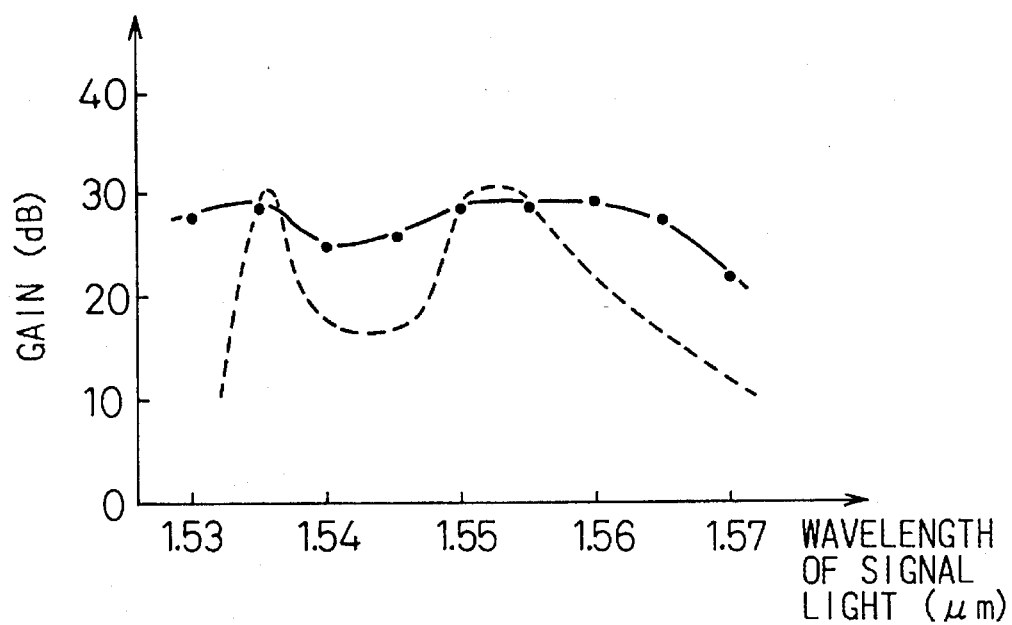
FIG. 2 is a graph showing curves representing the wavelengths of signal light according to the prior art.

The gain of the Er-doped fiber 31 is dependent on the wavelength of the signal light as indicated by the dotted line in FIG. 2, due to the absorption and fluorescence of Er. The gain peaks at wavelengths 1.536 and 1.55 micrometers and drops at around 1.54 micrometers. The pump light is a laser beam of 1.48 or 0.98 micrometers in wavelength for the optical fiber amplifier that handles signal light in the 1.5-micrometer band.

To compensate the gain drop around the wavelength of 1.54 micrometers and flatten the gain/frequency curve of the fiber 31, the fiber 31 may be doped with Al (aluminum) in addition to Er.

Figure 3:
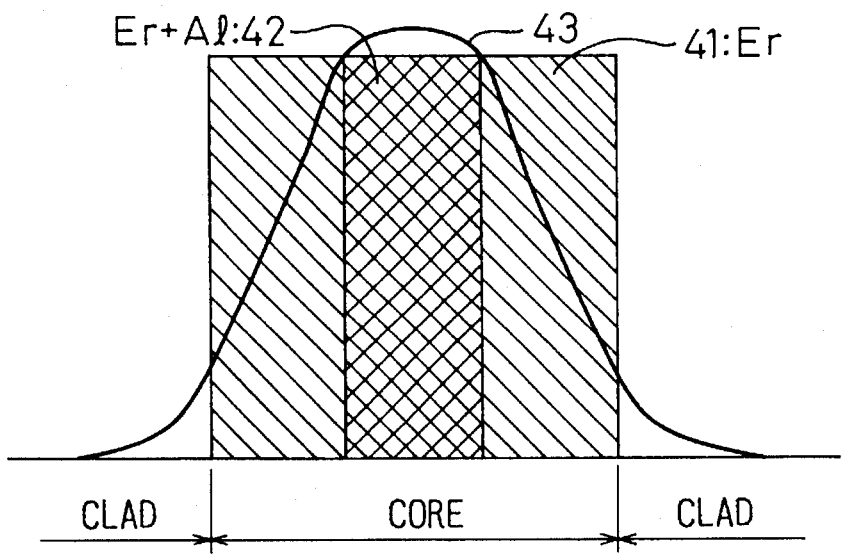
FIG. 3 shows the structure of an optical fiber according to a prior art.

FIG. 3 shows an optical fiber disclosed in Japanese Unexamined Patent Publication No. 4-86728. This disclosure dopes the center of a core of the optical fiber with Er and Al. Numeral 41 is a section doped with Er, and 42 is a section doped with Er and Al. Numeral 43 is an example of a distribution of luminous intensity of signal light in a diametrical direction. The whole of the core is doped with Er, and the center of the core is additionally doped with Al. This arrangement reduces phosphorescence at a wavelength of 1.53 micrometers. The Er distributed in the core below the threshold of the pump light gives no amplification and causes an absorption loss around a wavelength of 1.536 micrometers. This results in flattening the gain/frequency curve.

As indicated by the dotted line in FIG. 2, the gain drops near a wavelength of 1.54 micrometers of the signal light when the optical fiber is doped with Er alone. In the figure, a continuous line represents the gain of the Er-Al-doped optical fiber having Al in the center of the core. The Er-Al-doped fiber compensates for the gain drop, to thereby flatten the gain/frequency curve.

To amplify the optical signal of 1.55 micrometers in wavelength using the fiber 31, pump light of 1.48 or 0.98 micrometers in wavelength is employed. The pump light of 0.98 micrometers provides good gain and is usable with simple couplers. The wavelength of this pump light, however, greatly differs from that of the signal light, so that the field diameter (a width at 1/exp(2) of a maximum value on a luminous intensity curve) of the pump light greatly differs from that of the signal light. Accordingly, it is difficult to flatten the gain/frequency curve only by doping the fiber with Er and Al.

Figure 4:
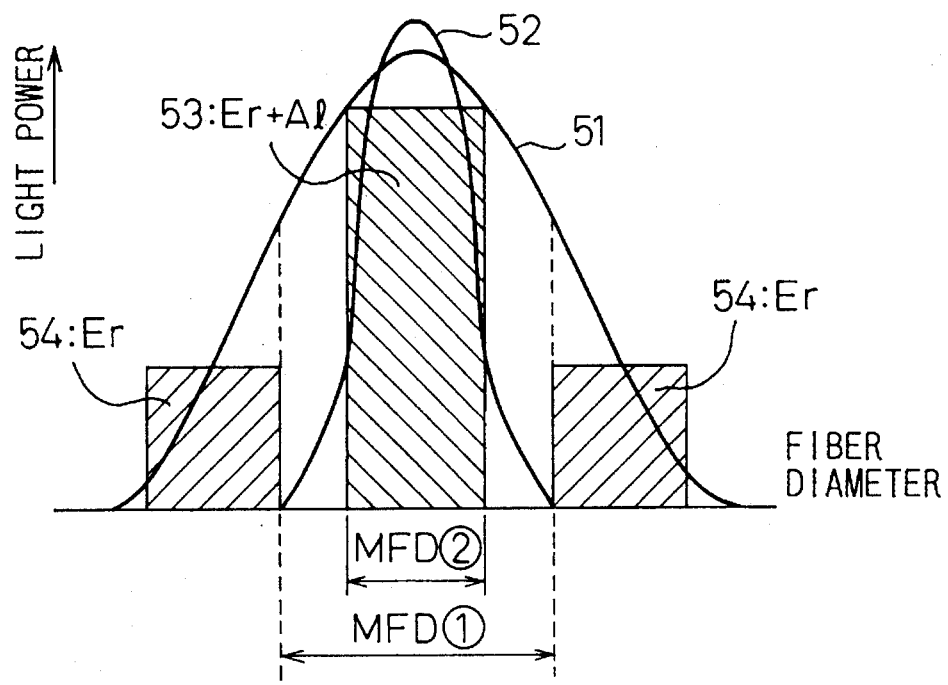
FIG. 4 shows the structure of an optical fiber according to a first aspect.

To solve this problem, the optical fiber amplifier according to the first aspect of the present invention employs the optical fiber shown in FIG. 4. The amplifier employs pump light of 0.98 micrometers in wavelength to amplify signal light. The center of the core CR is doped with Er and Al, and an annular periphery of the core CR is doped with Er. The Er-Al-doped center 53 corresponds to a section where the field diameter MFD (1) of a luminous intensity curve 51 of the signal light overlaps the field diameter MFD (2) of a luminous intensity curve 52 of the pump light. The Er-doped annular periphery 54 is outside the field diameter MFD (1) of the signal light.

The Al in the center 53 reduces fluorescence around a wavelength of 1.536 micrometers of the signal light, to compensate for a gain drop that will occur if the optical fiber contains only Er. The Er in the center 53 is excited with the pump light and transits to a ground state to cause stimulated emission to thereby amplify the signal light.

Since the Er in the periphery 54 is spaced apart from the center 53 and weak in luminous intensity, the Er only absorbs spontaneous emission from the core. Namely, the Er amplifies only the signal light but not the spontaneous emission. This results in improving and flattening the gain/frequency curve of the signal light.

Figure 5:
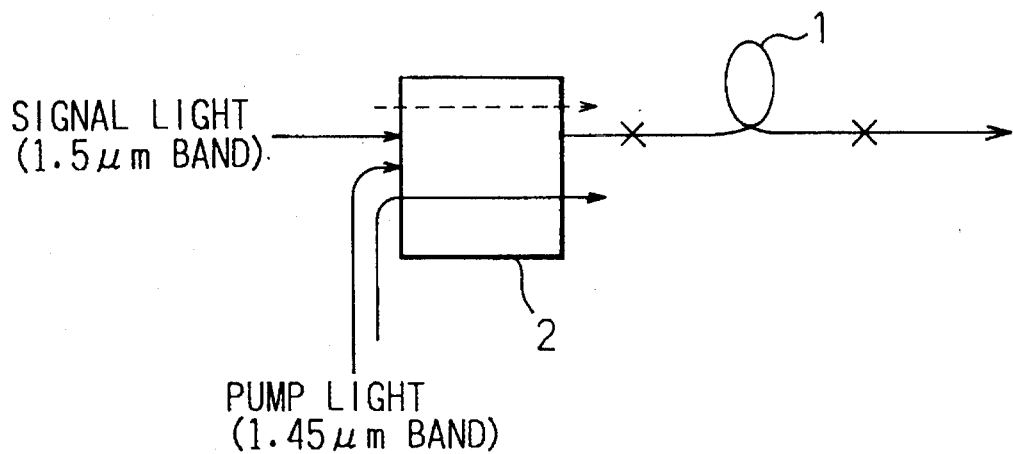
FIG. 5 is a block diagram showing a principle of an optical fiber amplifier according to the second aspect of the present invention.

FIG. 5 is a block diagram showing a principle of an optical fiber amplifier according to the second aspect of the present invention.

An optical fiber according to the present invention may have the same doped sections as those of FIG. 4. It is possible to arrange the annular periphery 54 of FIG. 4 in the clad of the optical fiber.

An optical fiber 1 of FIG. 5 transmits signal light of 1.5 micrometers in wavelength and pump light whose wavelength is in the absorption band of Er. An optical coupler 2 couples the signal light with the pump light.

Figure 6:
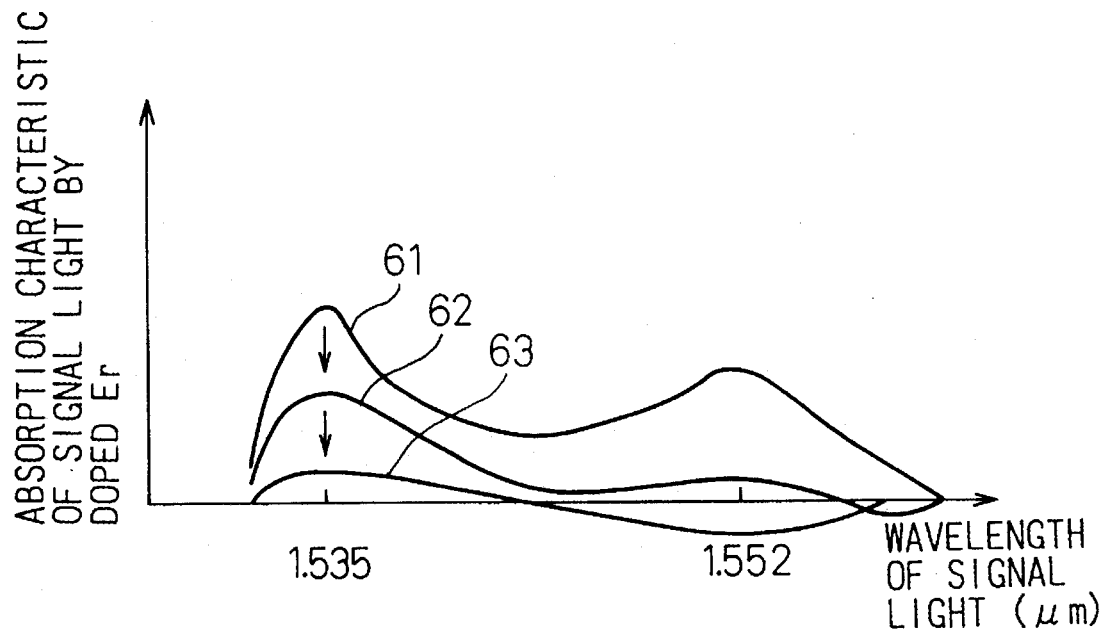
FIG. 6 is a graph explaining the operation of the second aspect of the present invention.

FIG. 6 shows the absorption characteristics of the optical signal with respect to pump light of 1.45 micrometers in wavelength that corresponds to the absorption band of Er. In FIG. 6, the abscissa indicates the wavelength of the signal light.

When the power of the pump light is reduced, there is a power level that absorbs the signal light of 1.535 micrometers. This phenomenon functions as a 1.535-micrometer band-cut filter. Accordingly, the signal light that is made incident to the coupler 2 of FIG. 5 is attenuated or blocked in the 1.535-micrometer band by the 1.45-micrometer pump light.

In this way, this aspect of the present invention provides a filter function for a predetermined wavelength without using optical parts such as filters.

The coupler 2 may be optionally arranged at an input or output end of the optical fiber 1.

Figure 7:
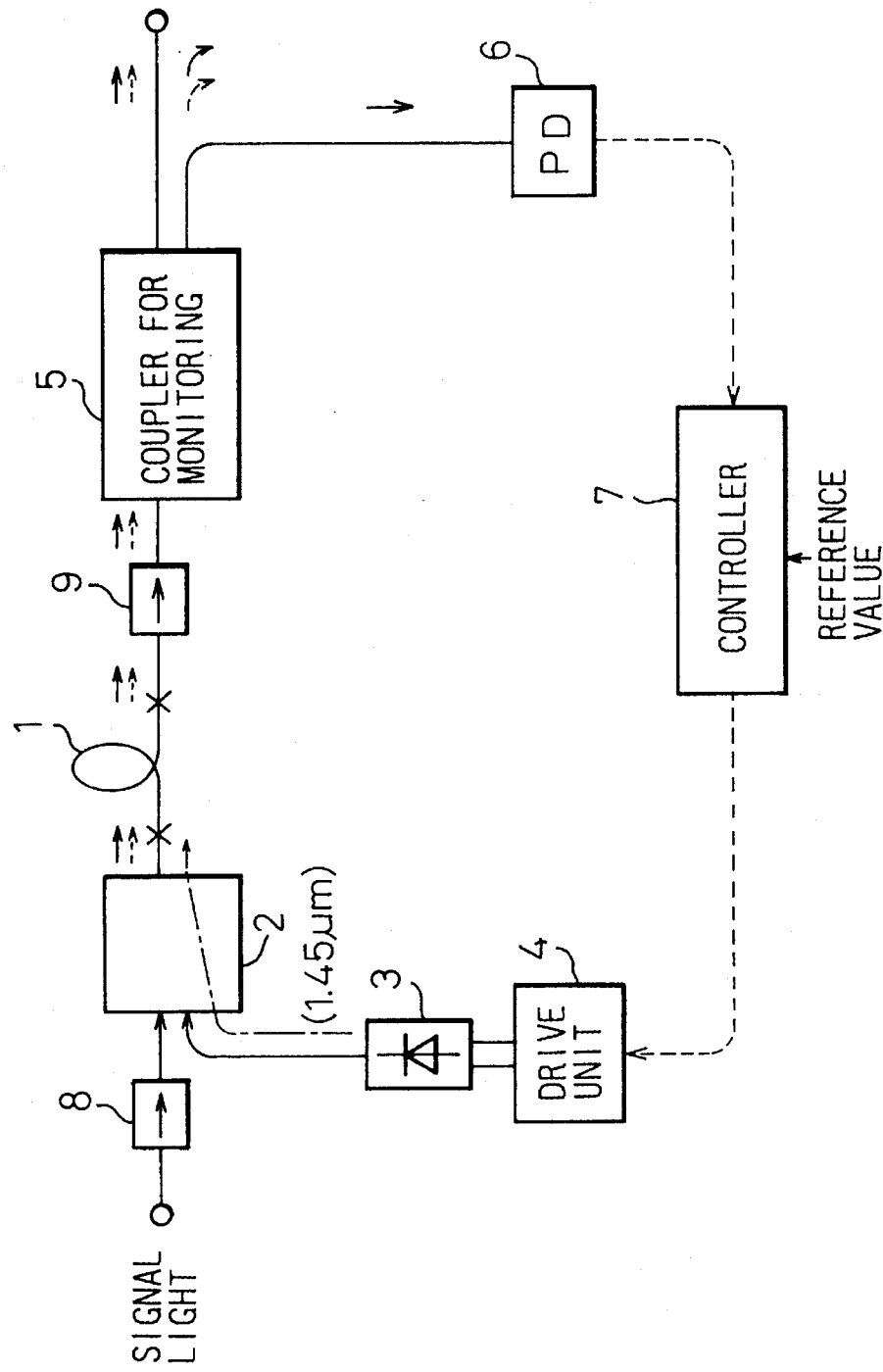
FIG. 7 is a block diagram showing a first embodiment of the present invention.

FIG. 7 shows an optical fiber amplifier according to the first embodiment of the present invention. This amplifier has an optical fiber 1, an optical coupler 2, a laser diode 3 for emitting pump light, a driver 4 for driving the laser diode 3, a monitoring coupler 5, a photodiode (PD) 6 for converting part of the signal light provided by the monitoring coupler 5 into an electric signal, a controller 7 for comparing the output signal of the photodiode 6 with a reference value to control the laser diode 3 through the driver 4, and isolators 8 and 9.

Figure 8:
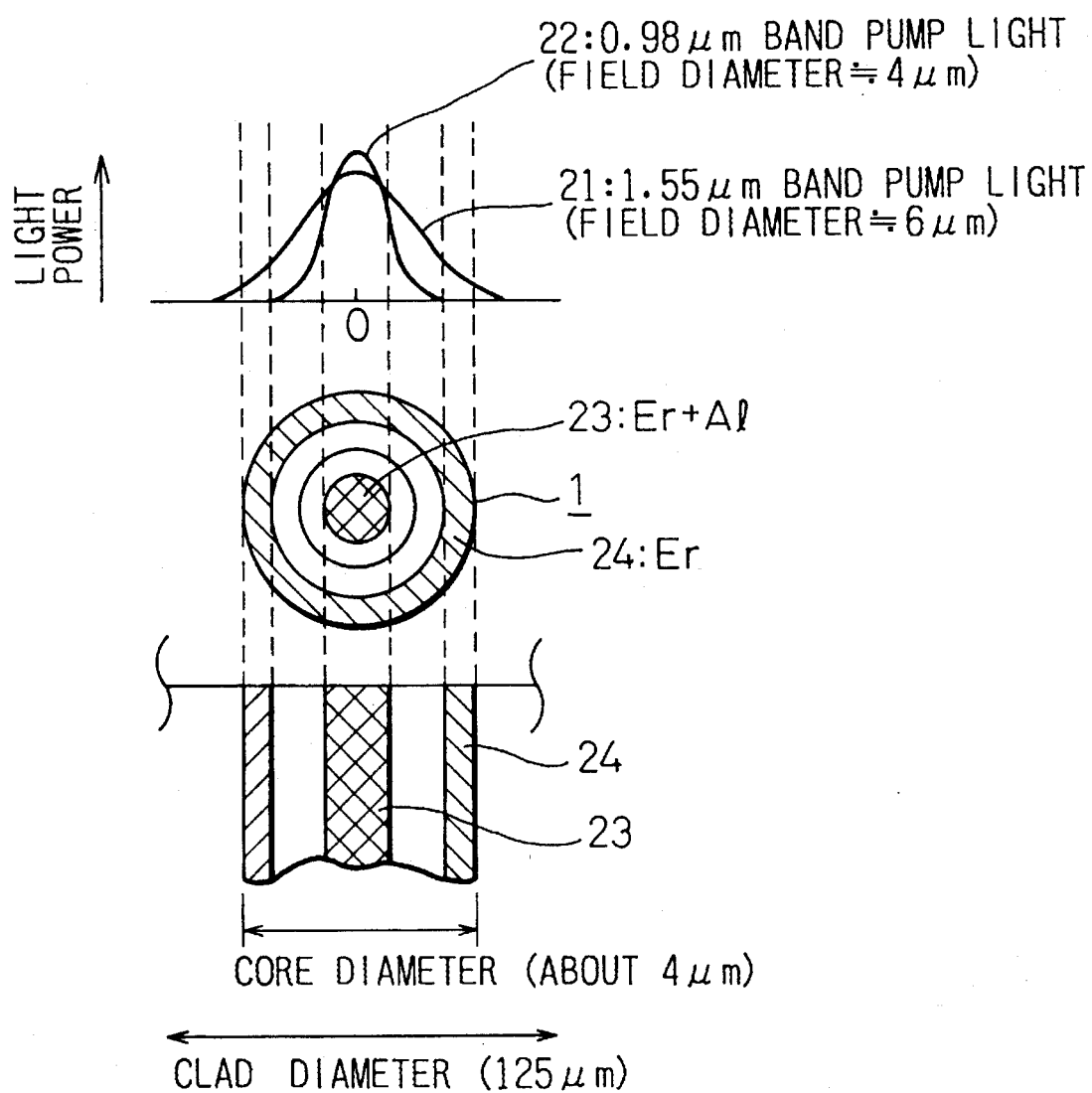
FIG. 8 shows the structure of an optical fiber according to the first embodiment of the present invention.

FIG. 8 shows the structure of the optical fiber 1 according to the first embodiment. The optical fiber 1 has a core CR of about 4 micrometers in diameter. The core CR has a center 23 of about 2 micrometers in diameter. The center 23 is doped with Er and Al. The center 23 improves the energy concentration with respect to a field diameter of about 4 micrometers on a luminous intensity curve 22 of the pump light in the 0.98-micrometer band.

The optical fiber 1 also includes an Er-doped section 24 with a field diameter of about 6 micrometers on a luminous intensity curve 21 of 1.55-micrometer optical signal.

The mode of Er in the center 23 is about 300 ppm, and that of Al is about 5000 ppm. The mode of Er in the periphery 24 is less than that in the center 23 and is changed according to the gain of the optical fiber.

The controller 7 controls the driver 4 to control the output level of the laser diode 3, which emits the pump light to the coupler 2.

The 1.45-micrometer band pump light is made incident to the optical fiber 1 through the coupler 2 and provides a function of filtering the 1.535-micrometer band of the signal light, as shown in FIG. 6.

The 1.55-micrometer band signal light entered into the optical fiber 1 through the isolator 8 and coupler 2 is attenuated in the 1.535-micrometer band, to suppress spontaneous emission.

The signal light amplified by the optical fiber 1 is emitted through the isolator 9 and monitoring coupler 5. Part of the signal light separated by the monitoring coupler 5 is converted into an electric signal by the photodiode 6, and the electric signal is fed back to the controller 7.

The controller 7 compares the output signal of the photodiode 6 with the reference value, to control the level of the pump light provided by the laser diode 3 through the driver 4 so that the output level of the photodiode 6 is equalized to the reference value.

The reference value in the controller 7 is determined to provide, for example, the middle one of the characteristic curves shown in FIG. 6.

The coupler 2 may be positioned at the output end of the optical fiber 1.

In this way, the first embodiment properly lowers the power of the pump light in the 1.45-micrometer band, to filter the signal light in the 1.535-micrometer band. The pump light may be in the 0.98-micrometer band. In this case, the gain of the signal light in the 1.535-micrometer band will be excessively increased if the power of the pump light of 0.98-micrometer band is increased to provide a sufficient gain for the signal light in a 1.552-micrometer band.

Figure 9:
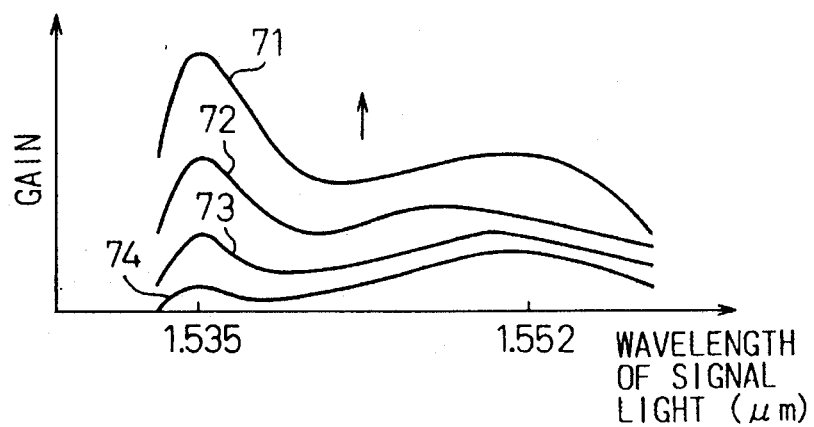
FIG. 9 shows curves showing the relationship between the wavelength of signal light and the gain of the amplifier according to the third aspect of the present invention.

To solve this problem, the third aspect of the present invention combines the absorption characteristics of FIG. 6 and the gain characteristics of FIG. 9, to optimize the gain of the signal light in both the 1.535- and 1.552-micrometer bands.

Figure 10:
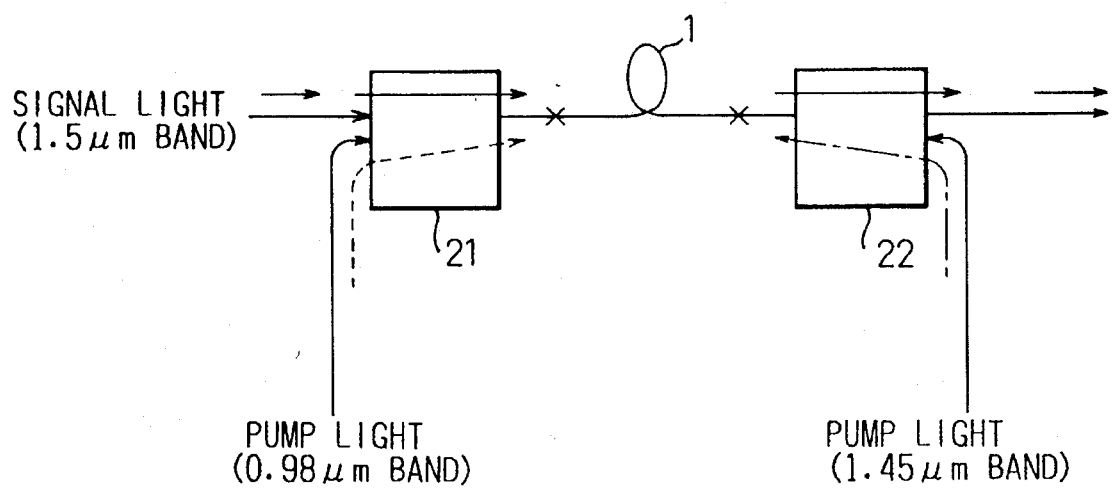
FIG. 10 is a block diagram showing a principle of an optical fiber amplifier according to the third aspect of the present invention.

FIG. 10 shows an example of the third aspect of the present invention. An optical coupler 21 is arranged at an input end of an optical fiber 1, and another optical coupler 22 is arranged at an output end of the optical fiber 1. Excitation light supplied to the coupler 21 is in the 0.98-micrometer band, and pump light supplied to the coupler 22 is in the 1.45-micrometer band.

This arrangement equalizes the gain of optical signal that involves multiplexed wavelengths in the 1.535- and 1.552-micrometer bands.

Figure 11:
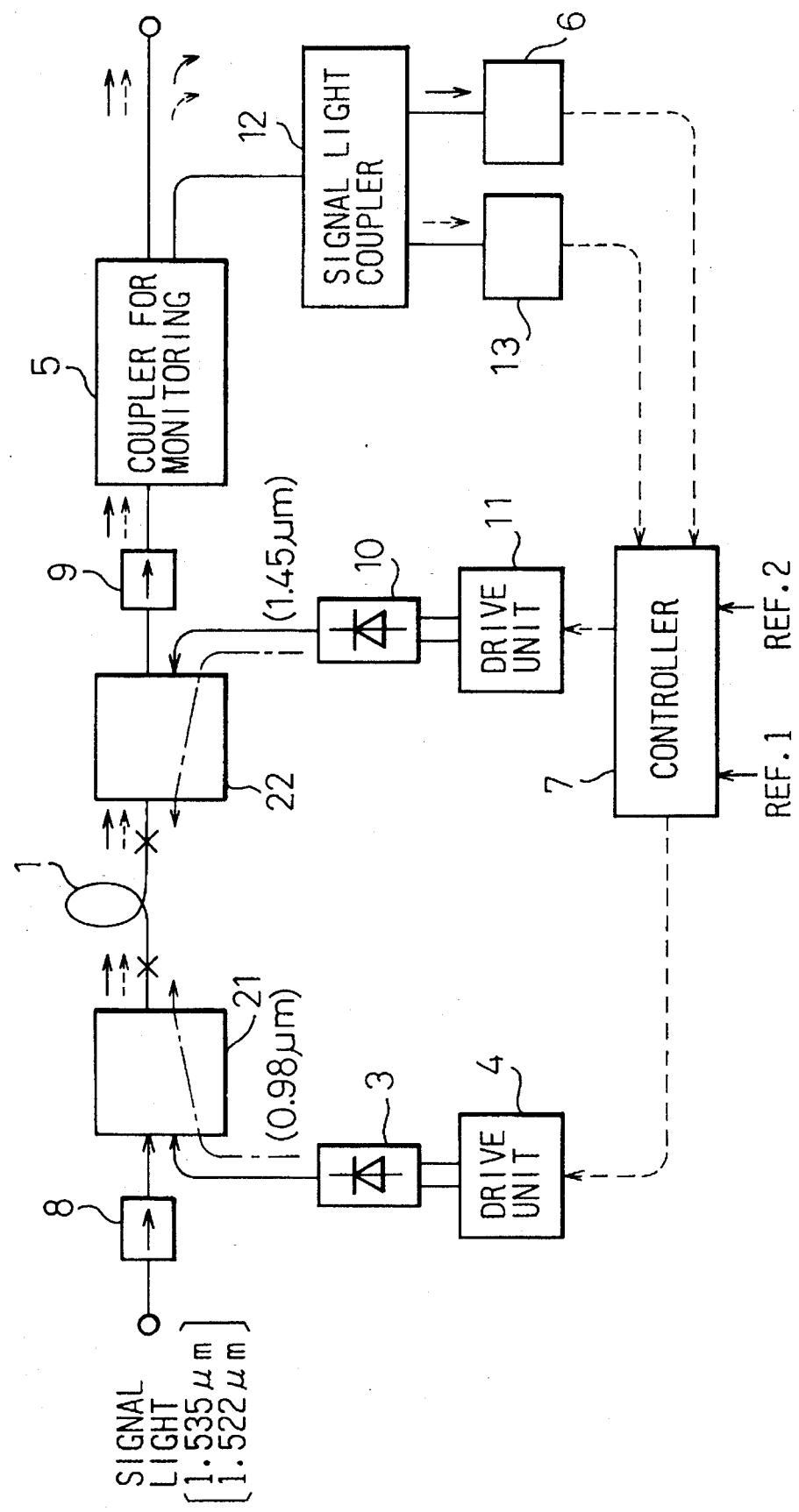
FIG. 11 is a block diagram showing a second embodiment of the present invention.

FIG. 11 shows the second embodiment of the present invention employing the optical fiber 1 of FIG. 8. Compared with the first embodiment of FIG. 7, the second embodiment employs two optical couplers 21 and 22 arranged on each side of an optical fiber 1. The coupler 21 is connected to a laser diode 3, and the coupler 22 is connected to a laser diode 10. The laser diodes 3 and 10 are driven by drivers 4 and 11, respectively, and both devices 4 and 11 are controlled by a controller 7.

Part of signal light passing through a monitoring coupler 5 is transferred to a signal light coupler 12, which divides the partial signal light into two parts, which are each converted into electric signals by photodiodes 6 and 13, respectively. The electric signals are transferred to the controller 7.

The optical signal of this embodiment involves multiplexed wavelengths of 1.535- and 1.552-micrometer bands. The coupler 12 separates the signal light into two parts each having respective wavelengths, and the two parts are transferred to the photodiodes 6 and 13, respectively.

The controller 7 employs two reference values REF1 and REF2. For example, the controller 7 controls the laser diode 3, through the driver 4, so that the signal light in the 1.535-micrometer band is equalized to the reference value REF1, and controls the laser diode 10, through the driver 11, so that the signal light in the 1.552-micrometer band is equalized to the reference value REF2.

The reference values REF1 and REF2 are set to provide optimum absorption and gain characteristic curves as shown in FIGS. 6 and 9.

Figure 12:
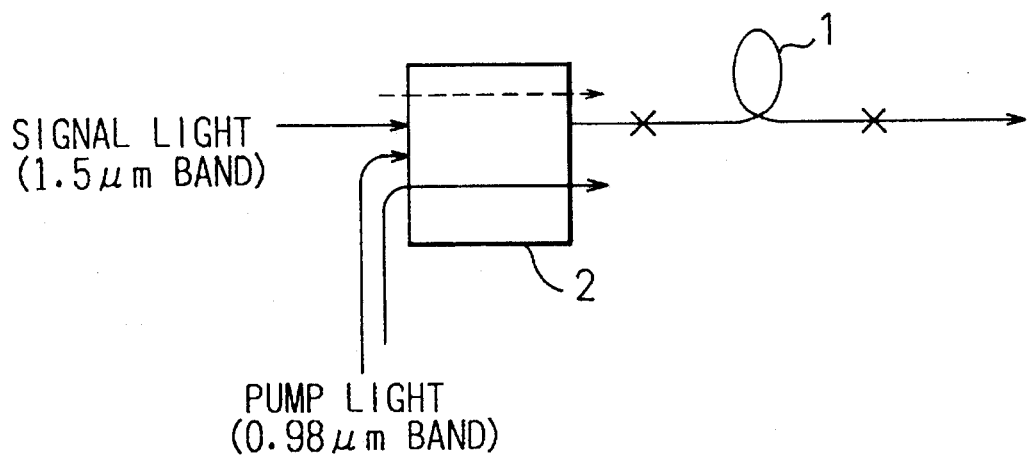
FIG. 12 is a block diagram showing a third embodiment of the present invention.

FIG. 12 shows a basic arrangement of the third embodiment of the present invention.

An optical coupler 2 couples optical signal in the 1.5-micrometer band with pump light in the 0.98-micrometer band, and an optical fiber 1 amplifies the signal light.

Figure 13:
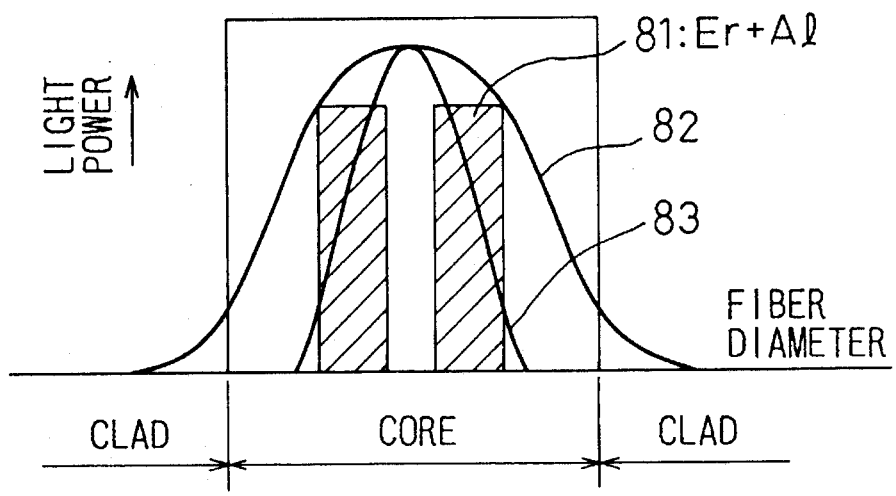
FIG. 13 shows the structure of an optical fiber according to the third embodiment of the present invention.

In FIG. 13, the third embodiment dopes the optical fiber 1 with Er and Al in a section spaced outside the center of the optical fiber 1.

As explained above, the first and second embodiments dope the core center of the optical fiber 1 with Er and Al, to form the optical fiber amplifier for amplifying optical signal in the 1.5-micrometer band using pump light in the 1.48- or 0.98-micrometer band.

Figure 14:
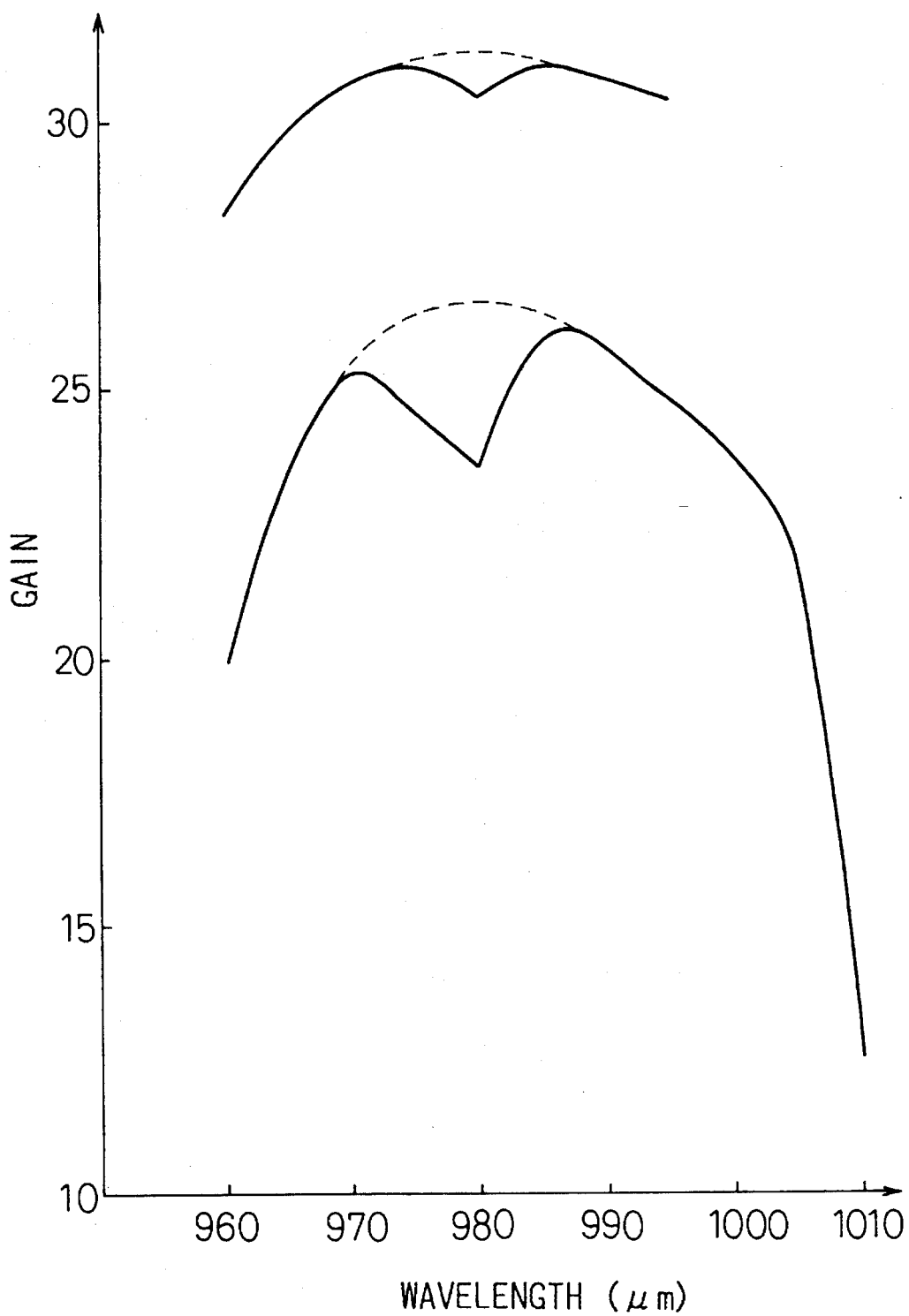
FIG. 14 is a graph explaining a pump-light-wavelength dependency of the gain of the optical fiber amplifier of the third embodiment.

As shown in FIG. 14, the gain for signal light in the 1.55-micrometer band achieved by the pump light in the 0.98-micrometer band is about 30 dB even if the power of the pump light is increased, as indicated the upper of the two characteristic curves. The reason of this will be explained.

Figure 15:
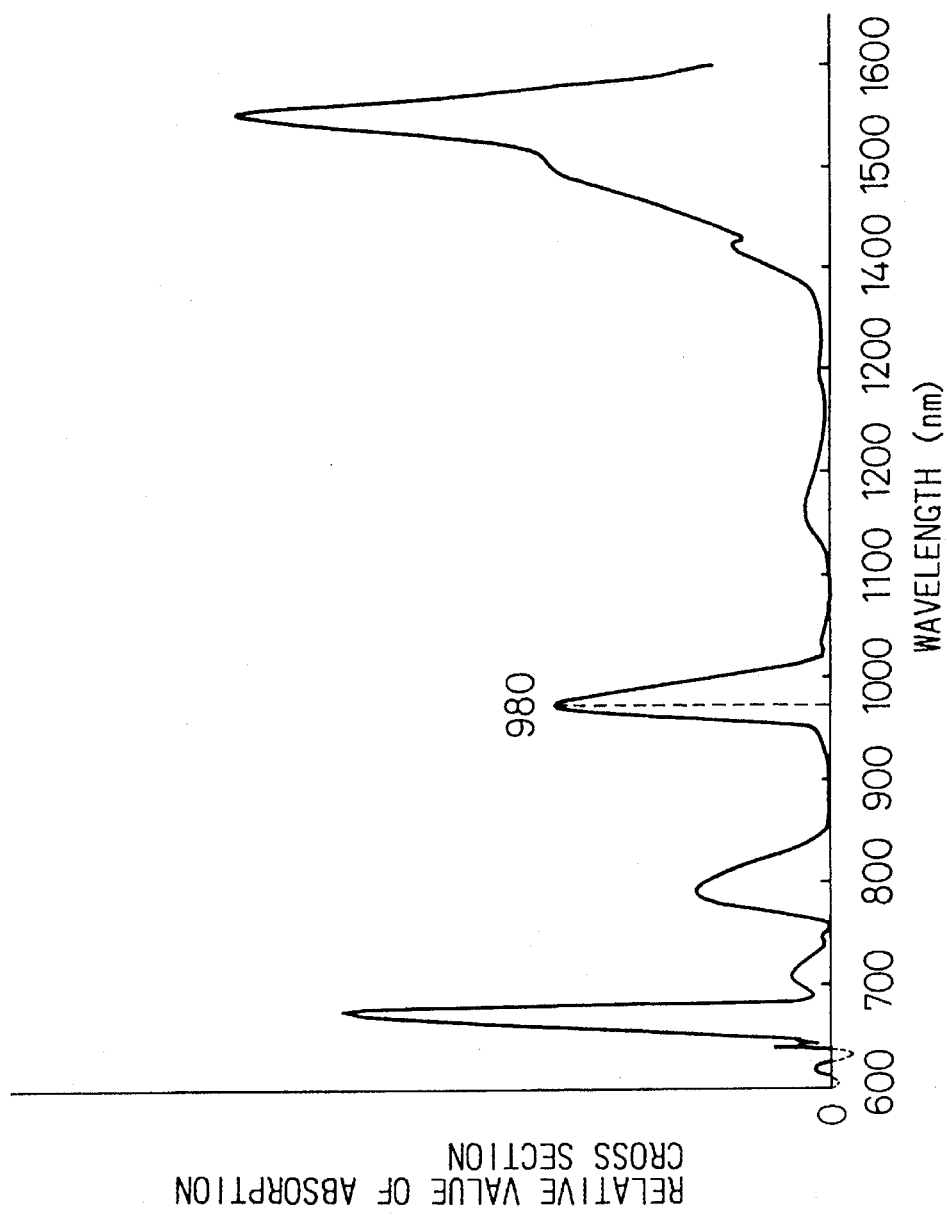
FIG. 15 is a graph showing the absorption characteristics, with respect to wavelength, of an optical fiber according to the third embodiment of the present invention.

The absorption curve for Er for the pump light in the 0.98-micrometer band is steeper than that for the pump light in the 1.48-micrometer band, as shown in FIG. 15. Accordingly, even a slight deviation in the wavelength of the pump light changes the quantity of absorbed light. In particular, with the pump light of the 0.98-micrometer band (0.96 to 1.00 micrometer), a wavelength of 0.98 micrometers corresponds to a peak of absorption cross section. In this case, the emission cross section of the signal light in the 1.5-micrometer band becomes smaller, so that, even if the power of the pump light to the optical fiber 1 is increased, the gain of the signal light is limited by the emission cross section of the signal light.

In FIG. 14, the pump light provides large gains at wavelengths of 0.975 and 0.985 micrometers. This may be because the relationship between the quantity of absorption of the pump light and the quantity of emission of the signal light is reversed from the case of a wavelength of 0.980 micrometers.

To change the absorption cross section and emission cross section of Er, other elements are usually mixed with Er. Alternatively, the Er-doped area may be located where the distribution of light power is low, to change the absorption quantity. Namely, Er may be distributed in an area spaced away from the center of the field diameter.

Examples of optical couplers employed by the above embodiments will be explained.

The couplers are classified into fusion type and bulk type. The fusion type coupler is made of two single mode optical fibers arranged side by side. The central areas of the fibers are heated and drawn into the coupler. The coupling ratio is adjusted according to the wavelength of pump light, to suppress fluctuations in the insertion loss. This, however, causes a polarization dependency of about 1 dB.

Figure 16:
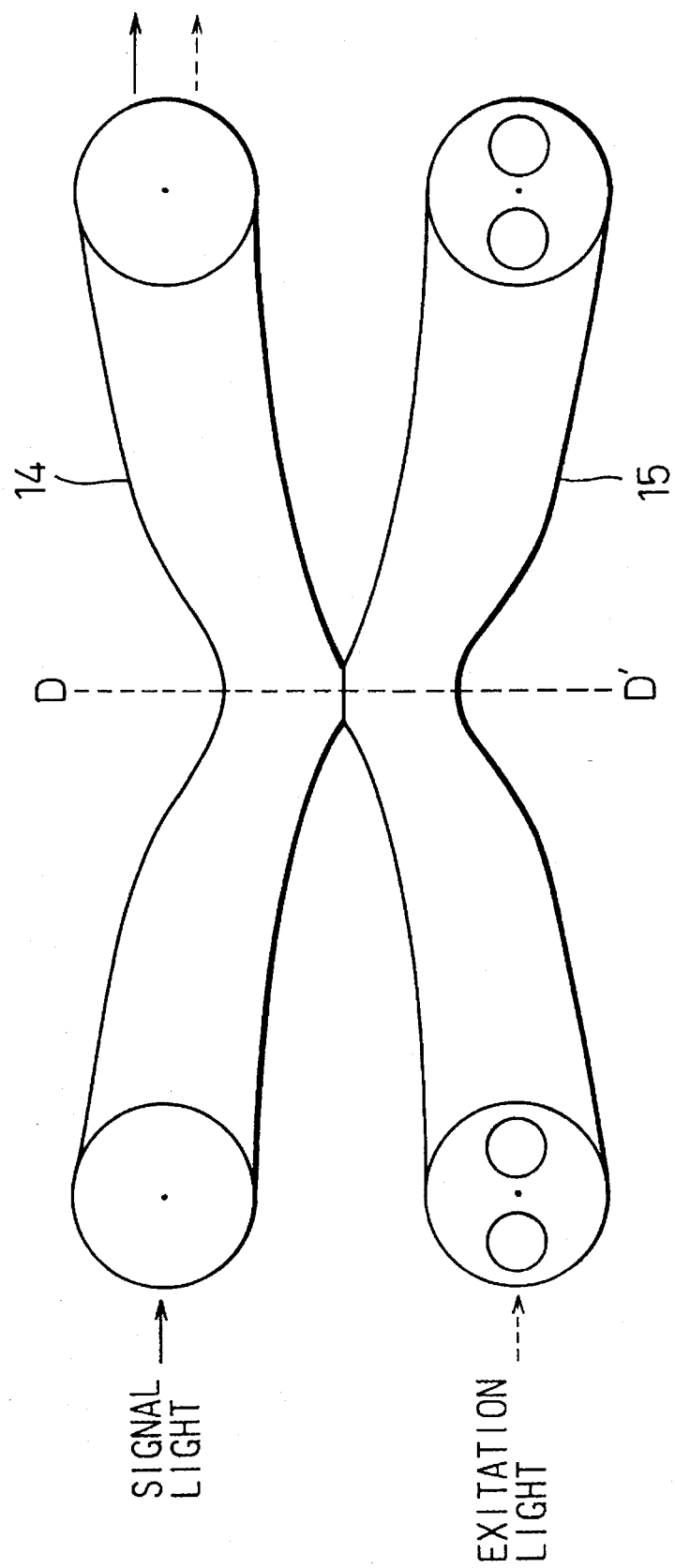
FIG. 16 shows an example of an optical coupler.

FIG. 16 shows an example of an optical coupler employed by the present invention. Two single mode optical fibers 14 and 15 are arranged side by side, and the central parts thereof are heated and drawn into the coupler. One of the optical fibers 14 and 15 is a polarization maintaining fiber serving as a pump light input port having no polarization dependency.

Since the polarization maintaining optical fiber 15 serves as the pump light input port, no polarization dependency occurs because it transmits fixed polarization.

An output optical fiber of a pump laser diode may be employed as the polarization maintaining fiber, and the pump light input port of the coupler is aligned with a polarization axis, to correctly guide pump light to the optical fiber 1.

Figure 17:
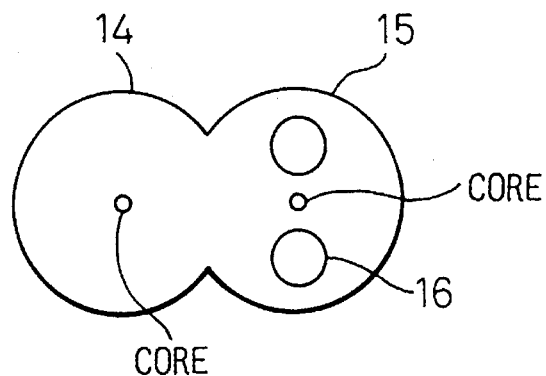
FIG. 17 is a sectional view taken along a line D—D' of FIG. 16.

FIG. 17 is a cross-sectional view taken along a line D—D' of FIG. 16. The single mode fiber 14 and polarization maintaining fiber 15 are arranged side by side such that stress applying parts 16 of the polarization maintaining fiber 15 are arranged orthogonal to a line extending between the cores of the fibers 14 and 15. The fibers 14 and 15 are then heated and drawn to fuse the central parts thereof.

Figure 18:
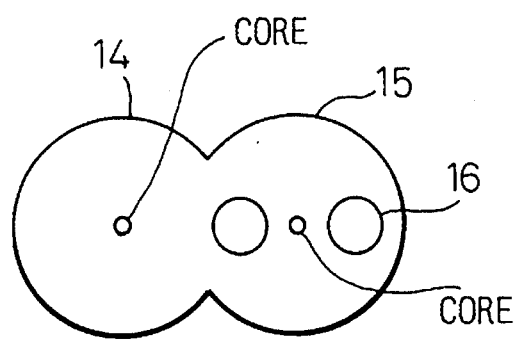
FIG. 18 is a sectional view showing another optical coupler.
Figure 19A:
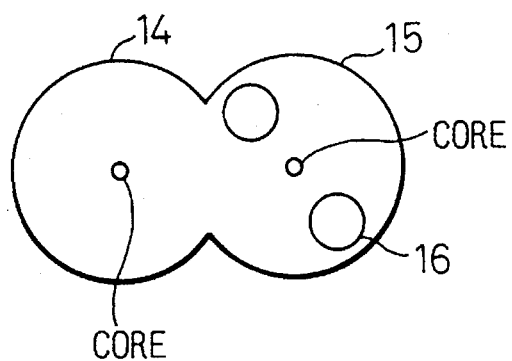
FIGS. 19A and 19B show sections of other optical couplers.
Figure 19B:
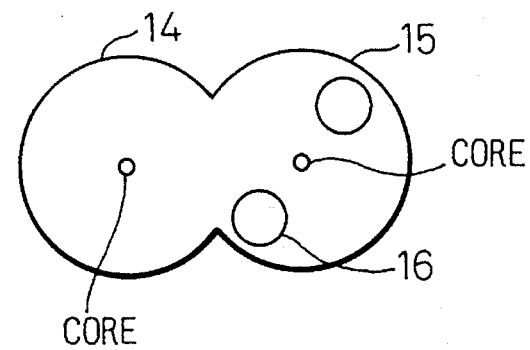

FIGS. 18, 19A and 19B show other examples of optical couplers. In FIG. 18, two fibers are fused together such that stress applying parts 16 of a polarization maintaining fiber 15 are on a line extending between the cores of the fibers. In FIGS. 19A and 19B, stress applying parts 16 of a polarization maintaining fiber 15 are arranged at 45 degrees with respect to a line extending between the cores of the fibers.

As explained above, the optical fiber amplifier according to the present invention employs optical signals in the 1.5-micrometer band and pump light in the 1.45-micrometer band that corresponds to the absorption band of Er. The amplifier provides a filtering function without employing optical parts such as filters and suppresses spontaneous emission.

The pump light may be in the 0.98-micrometer band, and still provide a filtering function and optimum gain.

The present invention may employ an optical fiber having an Er-Al-doped annular section around the center of the core of the fiber, to prevent a gain drop around the wavelength of 0.98 micrometers.

The present invention employs an optical coupler made of a combination of a single mode fiber and a polarization maintaining fiber. This arrangement eliminates polarization dependency and guides pump light at a stabilized power to an optical fiber, to provide a stabilized gain.

We claim:

1. An optical fiber amplifier for amplifying signal light using pump light, comprising an optical fiber and an optical coupler for guiding the optical signals and pump light to the optical fiber, the optical fiber having an erbium-aluminum-doped core center where the field diameter of the signal light overlaps that of the pump light and an erbium-doped annular section outside the field diameter of the pump light, the wavelength of the signal light being in the a 1.5-micrometer band, and that of the pump light corresponding to the absorption band of erbium.

2. The optical fiber amplifier according to claim 1, wherein the wavelength of the pump light is in the 1.45-micrometer band.

3. The optical fiber amplifier according to claim 1, wherein the optical coupler is arranged at the optical signals emitting end of the optical fiber.

4. The optical fiber amplifier according to claim 2, wherein the optical coupler is arranged at the optical signals emitting end of the optical fiber.

5. The optical fiber amplifier according to claim 1, wherein the optical coupler is arranged at the optical signals receiving end of the optical fiber.

6. The optical fiber amplifier according to claim 2, wherein the optical coupler is arranged at the optical signals receiving end of the optical fiber.

7. The optical fiber amplifier according to claim 1, employing pump light in the 0.98-micrometer band and pump light in the 1.45- micrometer band.

8. The optical fiber amplifier according to claim 7, comprising at least two optical couplers, so that the pump light in the 0.98- micrometer band and the pump light in the 1.45-micrometer band are made incident to the optical fiber through the optical couplers, respectively.

9. The optical fiber amplifier according to claim 7, comprising an optical coupler, positioned at one end of the optical fiber, for guiding the pump light in the 0.98-micrometer band and an optical coupler, positioned at the other end of the optical fiber, for guiding the pump light in the 1.45-micrometer band.

10. The optical fiber amplifier according to claim 9, wherein the optical signals are wavelength multiplexed optical signals, and the optical fiber amplifier further comprises:

monitoring means for dividing the optical signals into wavelength components, and for monitoring the power of the wavelength components; and control means for controlling the output levels of the pump light according to power levels of the wavelength components.

11. An optical fiber amplifier for amplifying signal light using pump light, the optical fiber amplifier comprising:

an optical fiber having a core; and an optical coupler guiding the signal light and the pump light to the optical fiber, wherein the optical fiber has an erbium-aluminum-doped annular section which is centered around the core of the optical fiber and is within the field diameter of the pump light, and the wavelength of the pump light is in the 0.98-micrometer band.

12. The optical fiber amplifier according to claim 1, wherein the optical coupler is made by fusing a single mode fiber for passing the signal light and a polarization maintaining fiber for passing the pump light.

13. The optical fiber amplifier according to claim 2, wherein the optical coupler is made by fusing a single mode fiber for passing the signal light and a polarization maintaining fiber for passing the pump light.

14. The optical fiber amplifier according to claim 7, wherein the optical coupler is made by fusing a single mode fiber for passing the signal light and a polarization maintaining fiber for passing the pump light.

15. The optical fiber amplifier according to claim 10, wherein the optical coupler is made by fusing a single mode fiber for passing the signal light and a polarization maintaining fiber for passing the pump light.

16. The optical fiber amplifier according to claim 11, wherein the optical coupler is made by fusing a single mode fiber for passing the signal light and a polarization maintaining fiber for passing the pump light.

17. An optical fiber amplifier for amplifying signal light using pump light, the optical fiber amplifier comprising:

an optical fiber; and an optical coupler which guides the signal light and the pump light to the optical fiber, wherein the optical fiber has an erbium-aluminum-doped core center where the field diameter of the signal light overlaps that of the pump light, and an erbium-doped annular section outside the field diameter of the pump light, and the wavelength of the signal light being in the 1.5-micrometer band, and the wavelength of the pump light corresponding to the absorption band of erbium.

18. The optical fiber amplifier according to claim 17, wherein the wavelength of the pump light is in the 1.45-micrometer band.

19. The optical fiber amplifier according to claim 17, wherein the optical fiber has an optical signal receiving end and an optical signal emitting end, and the optical coupler is arranged at the optical signal emitting end of the optical fiber.

20. The optical fiber amplifier according to claim 18, wherein the optical fiber has an optical signal receiving end and an optical signal emitting end, and the optical coupler is arranged at the optical signal emitting end of the optical fiber.

21. The optical fiber amplifier according to claim 17, wherein the optical fiber has an optical signal receiving end and an optical signal emitting end, and the optical coupler is arranged at the optical signal receiving end of the optical fiber.

22. The optical fiber amplifier according to claim 18, wherein the optical fiber has an optical signal receiving end and an optical signal emitting end, and the optical coupler is arranged at the optical signal receiving end of the optical fiber.

23. The optical fiber amplifier according to claim 17, employing pump light in the 0.98- micrometer band and pump light in the 1.45- micrometer band.

24. The optical fiber amplifier according to claim 23, comprising an optical coupler which couples the pump light in the 0.98- micrometer band to the optical fiber, and a different optical coupler which couples the pump light in the 1.45- micrometer band to the optical fiber.

25. The optical fiber amplifier according to claim 23, wherein the optical fiber has a first end and a second end, and the optical fiber amplifier further comprises an optical coupler, positioned at the first end of the optical fiber, for guiding the pump light in the 0.98-micrometer band and a different optical coupler, positioned at the second end of the optical fiber, for guiding the pump light in the 1.45-micrometer band.

26. The optical fiber amplifier according to claim 25, wherein the signal light represents wavelength multiplexed optical signals, and the optical fiber amplifier further comprises:
 monitoring means for dividing the optical signals into wavelength components, and for detecting the power of the wavelength components; and
 control means for controlling the output levels of the pump light according to power levels detected by the monitoring means.

27. The optical fiber amplifier according to claim 17, wherein the optical coupler is made by fusing a single mode fiber for passing the signal light and a polarization maintaining fiber for passing the pump light.

* * * * *

UNITED STATES PATENT AND TRADEMARK OFFICE
CERTIFICATE OF CORRECTION

PATENT NO. : 5,467,218
DATED : November 14, 1995
INVENTOR(S) : Keiko TAKEDA et al.

It is certified that error appears in the above-indentified patent and that said Letters Patent is hereby corrected as shown below:

Column 1, line 46, change "1.52" to –1.54–.

Signed and Sealed this

Fifth Day of March, 1996

Attest:

BRUCE LEHMAN

*Attesting Officer*     *Commissioner of Patents and Trademarks*